E. V. MYERS.
DOUBLE PUMP COUPLING.
APPLICATION FILED APR. 13, 1920.
1,383,008.
Patented June 28, 1921.
Fig.1.
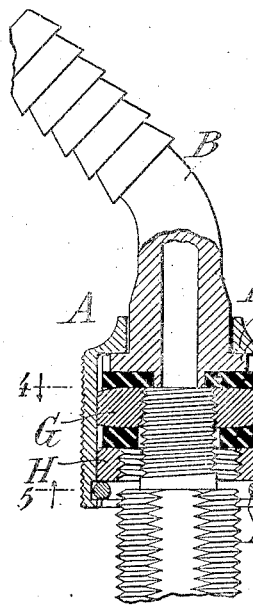
Fig.2.
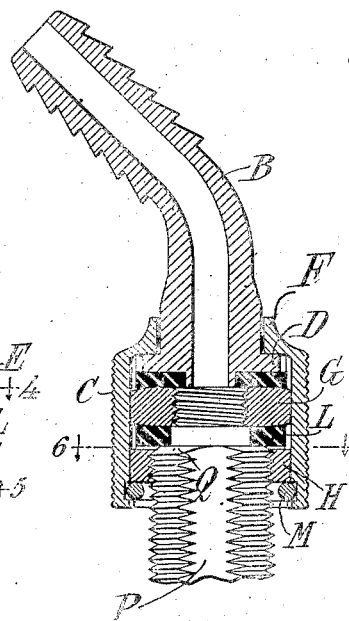
Fig.3.
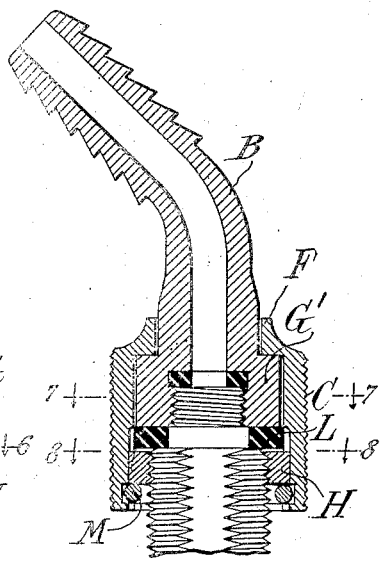
Fig.4.
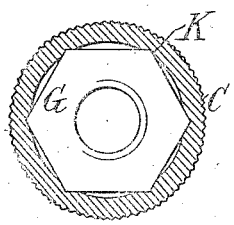
Fig.6.
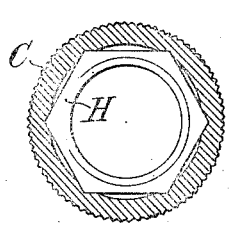
Fig.7.
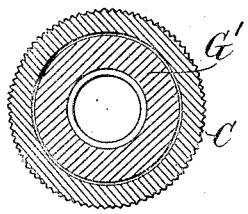
Fig.5.
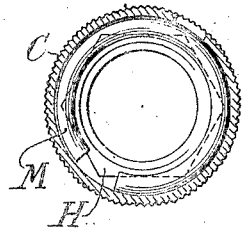
Fig.9.
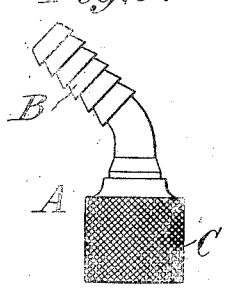
Fig.8.
INVENTOR
Eugene V. Myers
By Attorneys,
Fraser, Furk & Myers

UNITED STATES PATENT OFFICE.

EUGENE V. MYERS, OF EAST ORANGE, NEW JERSEY, ASSIGNOR TO A. SCHROEDER'S SON, INCORPORATED, OF BROOKLYN, NEW YORK, A CORPORATION OF NEW YORK.

DOUBLE PUMP-COUPLING.

1,383,008.  Specification of Letters Patent. Patented June 28, 1921.

Application filed April 13, 1920. Serial No. 373,596.

*To all whom it may concern:*

Be it known that I, EUGENE V. MYERS, a citizen of the United States of America, residing in East Orange, in the county of Essex and State of New Jersey, have invented certain new and useful Improvements in Double Pump-Couplings, of which the following is a specification.

This invention relates to pump couplings and aims to provide certain improvements therein.

The invention is particularly directed to a pump coupling which can be utilized in connection with valves of different construction. The standard Schrader valve in various sizes has a nipple of uniform diameter, so that various sizes of valve can be engaged with a single pump coupling, which screws onto the nipple. In certain valves intended for larger tires, such as truck tires, the nipple is omitted, and the principal object of the present invention is to provide a coupling which will engage not only the standard valves, but such truck tire valves.

In the drawing, wherein I have shown several forms of the invention,—

Figure 1 is a view partly in diametrical section, showing one form of the device connected with a standard valve;

Fig. 2 is a similar view showing the device connected with a truck tire valve;

Fig. 3 is a similar view showing a modified form;

Fig. 4 is a sectional view on the line 4—4 in Fig. 1;

Fig. 5 is a sectional view on the line 5—5 in Fig. 1;

Fig. 6 is a sectional view on the line 6—6 in Fig. 2;

Fig. 7 is a sectional view on the line 7—7 in Fig. 3;

Fig. 8 is a sectional view on the line 8—8 in Fig. 3;

Fig. 9 is an elevation on a smaller scale, of the pump coupling complete.

Referring first to the construction shown in Figs. 1 and 2, let A indicate the coupling as a whole, having the usual shank B and body portion C. Preferably the body portion C swivels on shank B, the shank having a flange D carrying a packing E, a flange F on the body portion being extended over the flange D.

According to the present invention I employ two nuts, one of which is adapted to engage the nipple of a standard valve, and the other of which is adapted to engage the exterior threads of the truck valve. The upper or smaller nut is indicated by the reference letter G, and preferably is formed separately from the body portion C and is connected thereto with a non-rotative connection. The larger nut, H, is also preferably formed separately of the body portion and similarly connected thereto. In the construction shown, the body portion is provided with internal drifts K designed to receive the corners of the nuts, which are best formed in hexagon shape. Between the two nuts G and H is located a packing washer L, and the nuts and packing washer are best held within the body portion by a split ring M which lies in a circular groove formed on the interior of the body portion.

In Fig. 1 is illustrated the coupling as applied to a standard valve, with the upper nut G engaging the nipple of the valve, and the latter forming a tight joint by engagement with the packing E. In Fig. 2 the coupling is illustrated as applied to a truck valve P, the upper edge Q of which contacts with the packing L. Such packing is pressed upwardly by the valve against the nut G, which in turn is pressed against the packing washer E, thus making a tight joint with the shank B.

In the construction of Fig. 3, the nut G is made in one piece with the shank B, as indicated at G'. In this construction, when the coupling is applied to a standard valve, the shank itself must be rotated. On the other hand, when applied to a truck valve, the packing L remains stationary upon the nut G', the nut H swiveling with the body portion C.

It will be observed that I am enabled to provide a structure in which the upper nut screws on the nipple of the valve, and the lower nut screws upon the body portion of the valve, by making the nuts of such thickness that when the upper nut is engaged with the nipple, the lower nut lies above the body portion of the valve, so that the threads thereof do not engage such body portion.

While I have shown and described several forms of the invention, it will be understood that I do not wish to be limited thereto, since various changes may be made therein without departing from the spirit of the invention.

What I claim is:

1. A coupling for pneumatic tire valves or the like, comprising a pair of nuts of different diameters mounted one above the other, the upper nut being adapted to screw on a pneumatic tire valve nipple, and the lower nut being adapted to screw on the body portion of a pneumatic tire valve, and the two nuts having a combined thickness not greater than the length of the tire valve nipple.

2. A coupling for pneumatic tire valves or the like, comprising a pair of nuts of different diameters mounted one above the other, the upper nut being adapted to screw on a pneumatic tire valve nipple, and the lower nut being adapted to screw on the body portion of a pneumatic tire valve, the two nuts having a combined thickness not greater than the length of the tire valve nipple, and a packing above the upper nut, and a second packing interposed between the two nuts.

3. A coupling for pneumatic tire valves comprising two nuts, the upper nut adapted to engage a tire valve nipple, and the lower one adapted to engage the body portion of the valve, and a packing interposed between the two.

4. A coupling for tire valves comprising a shank, an upper nut adapted to engage the nipple of a tire valve, a lower nut adapted to engage the body of a tire valve, and a packing interposed between the two, the combined thickness of said nuts and packing being less than the length of the tire valve nipple.

5. A coupling for tire valves comprising a shank, a body portion swiveled thereto, an upper nut adapted to engage a tire valve nipple, a lower nut fixed against rotation in said body portion, both nuts being substantially fixed against axial movement.

6. A coupling for tire valves comprising a shank, a body portion swiveled thereto, an upper nut adapted to engage a tire valve nipple, a lower nut fixed against rotation in said body portion, both nuts being substantially fixed against axial movement, and a packing between the upper and lower nuts.

7. A coupling for pneumatic tire valves comprising a shank, a body portion swiveled thereto, a pair of nuts separably connected with the interior of said body portion, and a packing interposed between said nuts, and means for holding said nuts in said body portion.

In witness whereof I have hereunto signed my name.

EUGENE V. MYERS.